United States Patent
Ketler, Jr.

[15] 3,657,017
[45] Apr. 18, 1972

[54] SELF-FEEDING SEA WATER BATTERY

[72] Inventor: Albert E. Ketler, Jr., 318 North 6th Street, Indiana, Pa. 15701

[22] Filed: Oct. 20, 1970

[21] Appl. No.: 82,389

[52] U.S. Cl. .................................................136/100 R
[51] Int. Cl. .....................................................H01m 17/00
[58] Field of Search ...............................136/100, 112–114, 136/90, 6, 86

[56] References Cited

UNITED STATES PATENTS

| 2,925,455 | 2/1960 | Eidensohn et al. | 136/100 R X |
| 3,036,142 | 5/1962 | Goldenberg et al. | 136/100 M |
| 3,428,493 | 2/1969 | Adams | 136/100 R |
| 3,542,599 | 11/1970 | Fiandt | 136/100 R |

*Primary Examiner*—Anthony Skapars
*Attorney*—Green, McCallister & Miller

[57] ABSTRACT

A galvanic cell or battery is powered by a centrally disposed anode and an outwardly, edgewise-spaced and disposed group of outwardly disposed cathodes of dissimilar electrolytically reactive metal, and has lever-operated lifting means or spring means for automatically adjusting the relation between the cathodes and the anode as the anode is destructively worn away during power generating utilization of the battery. The adjusting means is adapted to exert lateral, radial or axial pressure on the group of cathodes to urge them against insulating means which defines a desired operative spacing between the anode and the group of cathodes. Wire screen material is folded or wound about and is secured on a centrally positioned metal backing member to provide cathode elements.

17 Claims, 12 Drawing Figures

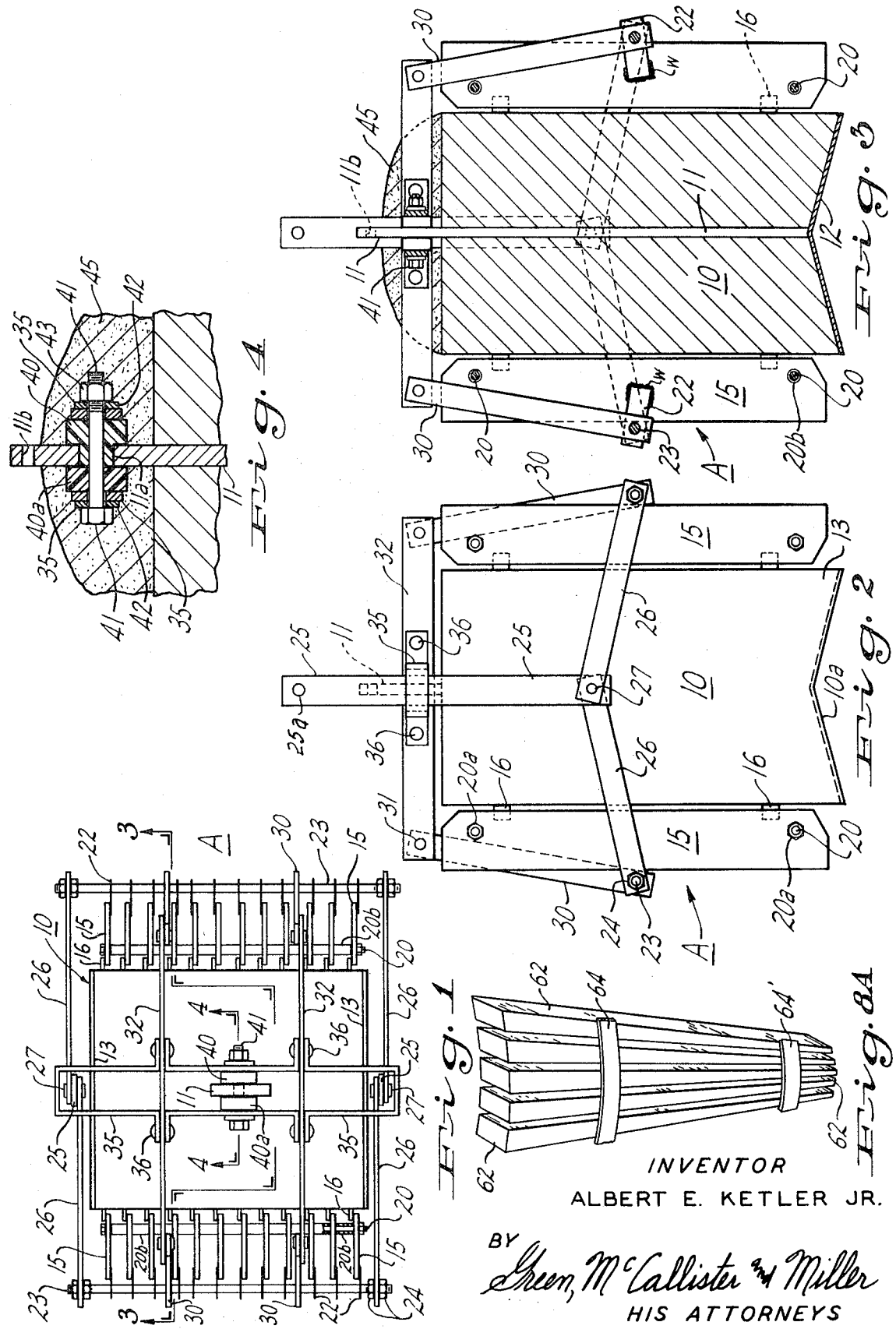

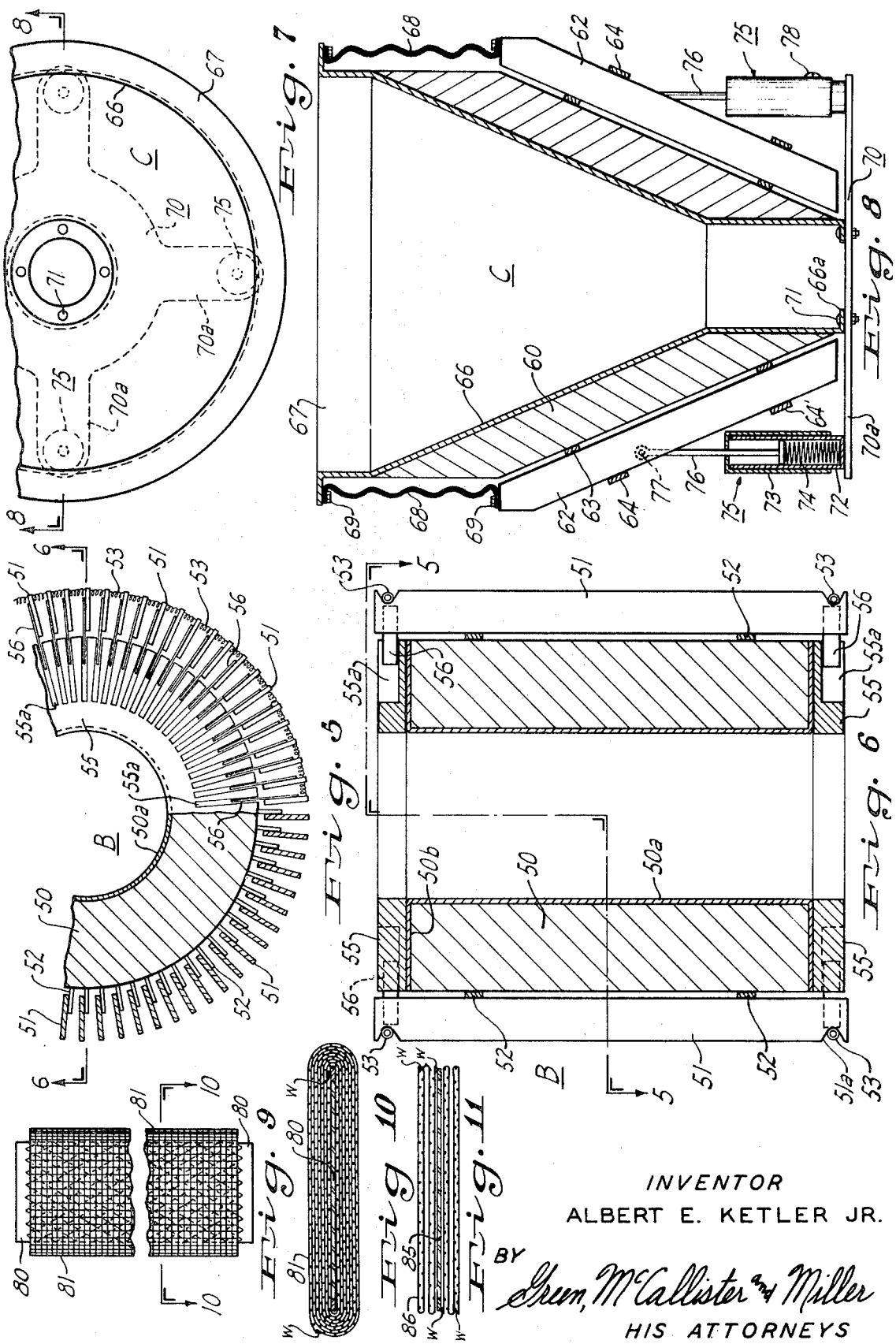

3,657,017

SELF-FEEDING SEA WATER BATTERY

BACKGROUND OF THE INVENTION

This invention relates to an improved sea water galvanic cell or battery and particularly, to a battery that is self-adjusting during its operating life. A phase of the invention relates to an improved cathode construction and another phase pertains to means for adjusting the operating spacing between cathodes and an anode to compensate for deterioration or sluffing-away of active surfaces or faces of the anode.

Since a battery used in a sea water installation is preferably and usually of necessity left in position once it has been installed, the problem arises of giving the battery a maximum operating life and particularly, of maintaining its electrical power output substantially constant throughout its full operating life. Attempts have been made to meet this problem by providing electrode elements of increased operating surface area and placing them in better operating relationships. In this connection, I have found that it is highly desirable to mount or position the cathode elements as a group or array having an edgewise-facing relation with respect to the anode, rather than as heretofore customary, with their wide side faces in a directly opposed relation with respect to the anode electrode or element. Although the edgewise positioning has enabled a material increase in the effective life of the battery and in its operating efficiency, the problem still remains of retaining a full and substantially constant E.M.F. and current flow from the battery throughout its operating life. I have been able to solve this problem by a new approach to the construction of the battery.

SUMMARY OF THE INVENTION

The above-mentioned problem has been solved by providing an automatic position adjusting means, as exemplified by a lever mechanism which is actuated by lifting or suspending force applied to the battery in its operating situs or by a flexible, resilient or like means for urging the group of cathode elements towards the anode. Separator insulating means is employed between the anode and the cathodes for, at all times, limiting the maximum closeness of or the minimum spacing therebetween. The separating means effectively cooperates with the automatic means and will, itself, be movable with the cathode elements to retain the selected effective spacing in cooperation with the urging of automatic adjusting or deterioration compensating means of the invention.

In the drawings,

FIG. 1 is a top plan view of a battery constructed in accordance with the invention and which operates on what may be termed a lateral adjusting type of movement between its opposed electrodes.

FIG. 2 is a side view in elevation on the scale of and of the battery embodiment of the invention shown in FIG. 1.

FIG. 3 is a side section in elevation on the scale of FIG. 2 and taken along the line 3—3 of FIG. 1.

FIG. 4 is an enlarged fragmental vertical section taken along the line 4—4 of FIG. 1, showing means for mounting the anode in an insulated relation with respect to a support structure of the embodiment represented by FIGS. 1 to 3, inclusive.

FIG. 5 is a fragmental top plan view that is partially sectioned and taken along the line 5—5 of FIG. 6; it is illustrative of a second form of the invention which may be termed a radial adjustment type.

FIG. 6 is a central sectional view in elevation on the scale of and taken along line 6—6 of FIG. 5.

FIG. 7 is a fragmental top plan view of a further embodiment of the invention.

FIG. 8 is a vertical sectional view on the scale of and taken along the lines 8—8 of FIG. 7.

FIG. 8A is a vertical fragmental view showing the construction of cathode element groups or assemblies of the embodiment of FIGS. 7 and 8.

FIG. 9 is a broken-away view in elevation illustrating an improved form of cathode element or electrode construction of the invention.

FIG. 10 is a horizontal section of the cathode construction of FIG. 9 taken along the line 10—10 thereof.

And, FIG. 11 is a horizontal section on the scale of FIG. 10 illustrating a modified form of cathode construction in which metal screen material is used in folded form rather than the wound form of FIGS. 9 and 10.

Referring particularly to FIGS. 1, 2 and 3, a galvanic battery A is shown which may be termed a lateral adjusting type. In this battery, a pair of opposed side-positioned groups, assemblies or arrays of vertically extending or elongated cathode elements or electrodes 15 are disposed in an operative relation with respect to planar, opposite, operating sides or faces of a centrally disposed anode 10 of rectangular shape. In a battery construction of the invention, any suitable different metals may be used for the anode and cathode elements. For example, the anode 10 may be a casting of magnesium metal and the cathodes 15 which are shown in an end or edgewise-aligned or opposed operating relation with respect to the anode 10 may be of a metal such as iron, nickel or steel.

In battery A, a lever suspension system or means is employed for utilizing the weight of the battery to automatically apply an inward, alignment-maintaining or operating space adjusting force to the pair of side-positioned, oppositely disposed cathode assemblies or arrays. Means in the form of suitable insulating spacers or stand-off insulating elements or members 16 are provided to maintain a desired or effective minimum operating spacing between the cathodes 15 and the anode 10. The elements 16 are carried by the cathodes to accommodate their positioning with respect to the exposed operating surfaces of the anode 10 as it is eroded-away or electrically corroded during the operating life of the battery. The non-conducting or insulating spacer elements 16 are shown attached in place within recess portions of each cathode 15 to project outwardly therefrom. If more convenient, longitudinal members or strips may be employed to extend along upper and lower horizontal slots of each array or assembly of the cathodes 15 to provide a unitary spacer means adjacent the upper and lower end portions of the cathodes.

In the specific construction represented by battery A, the anode 10 is shown provided with a centrally upwardly, outwardly, longitudinally, extending steel strip piece or core member 11 of straplike or rectangular shape which has a hole therethrough to serve as mount portion 11a for suspending the anode 10 centrally from an overhead support frame structure 35. The vertical core member 11 may be the member about which or on which the anode 10 is cast during its formation. It will be noted that the upper end of the member 11 may be provided with a hole or eyelet 11b there-through to receive a binding screw or mount for an electrical lead. The lower end of the anode 10 is shown provided with a central concavity 10a that is defined by a pair of oppositely extending, inwardly upwardly converging planar faces. To protect such faces from erosion, a plastic coating 12 may be applied thereto as shown in FIG. 3. This slope thus facilitates the removal of debris from the battery. As shown in FIG. 1, a plastic (epoxy) insulation coating 13 may also be applied to opposite, exposed side faces of the anode 10 to protect them from direct erosion.

Through-extending threaded rod members 20 are employed adjacent upper and lower end portions of the cathodes 15, along with mounting nuts 20a and spacer sleeves 20b, to secure the cathodes 15 together as an assembly or array. Thus, the cathodes 15 on each side of the battery are electrically and mechanically secured together as opposed arrays. As shown particularly in FIGS. 1 and 3, an outwardly extending and slightly upwardly inclined mounting lug 22 is secured, as by weld metal w, along the side of each cathode 15 substantially intermediate its upper and lower ends. A through-extending threaded operating rod or shaft 23 is pivotally mounted to extend through the outer end portion of each of the mounting tabs 22 of each side array or assembly of cathodes 15, and is mounted in a secured relation on outer end portions of a pair of end-positioned lever arms 26 by end-positioned nut and washer assemblies 24. At each end or exposed side of the battery A, a somewhat scissors-like operating lever system has been provided which includes a pair of cross-extending, scissors-like, lever arms 26 and a vertically upwardly extending, centrally operatively positioned, leg member 25 which extends upwardly through and above a longitudinally extending substantially rectangular-shaped, overhead, stationary support frame structure 35.

The upper end of each end-positioned vertical operating leg 25 may be provided with an eyelet or hole portion 25a for receiving a suitable electrical connector or binding post for the cathode assembly. The lower end of each pair of opposed leg members 25 is pivotally connected by a pin 27 to inner ends of an associated end-positioned pair of the lever arms 26. Each lever arm 26 at its outer end carries an end portion of an associated side-positioned, longitudinally extending, operating shaft 23. Each cathode array also has a pair of vertically upwardly, inwardly extending, mounting or supporting legs 30 which, at their lower ends, rotatably bypass an associated through, longitudinally extending, operating rod or shaft member 23. At their upper ends, each opposed pair of upright supporting legs 30 is secured or connected together by a horizontally cross-extending overhead support arm or member 32 by means of pivot pins 31. A longitudinally extending, horizontally positioned, rectangular support frame 35, which may be made up of three sections, as shown in FIG. 1, is centrally positioned over the top end of the battery A. The parts or sections of the support frame 35 are secured to the cross-extending support members 32 and in an assembled relation by rivets 36 that extend through mounting flanges of the parts of the frame structure.

As particularly shown in FIGS. 3 and 4, the vertical core member or strap piece 11 serves to suspend or mount the anode 10 on the frame 35 in an electrically insulated relation with respect thereto. In this connection, a through-extending, sleevelike, insulating washer 40 cooperates with an insulating end washer 40a to electrically isolate a through-extending bolt and nut assembly 43. As shown in FIGS. 1 and 4, the nut and bolt assembly 43 is adapted to securely clamp the member 11 in a central position between opposed longitudinal members of the overhead frame 35. To strengthen the structure and protect the upper end of the anode 10, suitable fill material 45, such as an epoxy resin, may be poured and solidified in place over the frame structure 35 and the upper end of the anode 10, in such a manner as to leave the operating members 25 and 26 free for compensating adjustment or movement.

When the battery A is suspended by means of the pair of upright operating legs 25 in sea water, it will be apparent that a lateral-inward force is always maintained on the cathodes 15 of the two arrays or assemblies, urging them towards the opposed operating surfaces of the anode 10. As a result, as operating anode surfaces erode or sluff-away during the energy utilization of the battery, the spacers 16 will move inwardly to abut the new surface portions presented and the cathodes 15 will also move inwardly as limited or controlled by the spacers or stand-off elements 16.

In the embodiment of the invention particularly illustrated in FIGS. 5 and 6 as represented by battery B, an assembly or array of cathode elements 51 is disposed in a peripherally spaced-apart and radially endwise-extending, positioned or suspended relation with respect to a circular or annular outer operating surface of an anode member 50 shown as having an open center core. The purpose of the open center is to save metal, since the center or core portion does not customarily become an operating surface of the anode during its utilization in a sea water battery. In this particular construction, the core as well as the upper and lower end surfaces of the anode 50 are protected by integral steel liner portions 50a and 50b. End closure and structural parts 55 are secured as by welding to an associated liner portion 50b and have radial slot portions 55a to slidably guidably receive radially projecting mounting guide fingers 56 that are secured to project radially inwardly and in an electrically insulated relation with the closure parts 55 and thus with the anode 50.

Cathode elements 51, like the cathode members 15 of the battery A and cathode elements 62 of battery C are somewhat diagrammatically illustrated for simplicity, with details of a suitable construction illustrated in FIGS. 9 to 11, inclusive. In any event, each cathode 51 of the battery B will be of a flattened, pan cake like, vertically elongated shape and will carry upper and lower spacer, insulating elements or means 52 to maintain the minimum or desired spacing between their inner narrow end or edge surfaces or faces with respect to the opposed operating outer face or surface of the anode 50. The spacing insulator elements 52 may, as in the embodiment represented by battery A, be inset and fastened as individual elements within each cathode 51 to project inwardly therefrom or, if desired, may be an annular or circular shaped, continuous, insulating, band member interposed between the surrounding or encircling cathode array and the anode 50, but will be always mounted on the cathodes 51, as distinguished from the anode 50.

As shown, each cathode 51 has cross-extending or open upper and lower horizontal groove or slot portions 51a that serve to receive and mount a flexible, inward-force-generating or applying means, such as a continuous annular or circular spiral tension spring 53. A vertically spaced-apart pair of springs 53 is shown and each spring is mounted about the periphery of the cathode array assembly adjacent either its upper or lower end. It will be apparent that the springs 53 constantly urge the cathodes 51 radially inwardly towards the anode 50, as limited or controlled by the stand-off or spacer insulating elements or members 52. It is thus apparent that the battery B also operates in an automatic manner to progressively advance the cathode towards the operating surface of the anode, while it is being eroded during the operating pattern, and with such spacing being controlled by the stand-off insulating elements or means 52.

In battery embodiment C of FIGS. 7, 8 and 8A, automatic compensation of the positioning of four peripherally spaced-apart groups, arrays or assemblies of cathodes 62 with respect to a centrally disposed anode 60 is in a somewhat vertically inclined plane, as distinguished from the radial plane of the battery B, and the lateral plane of battery A. Like the anode of battery B, the anode 60 of battery C is shown provided with a hollow inner core that is protected by a steel lining 66 of a metal support and lining structure that extends therealong and terminates at its upper end in an annular mouth or ring flange 67 of angular section and terminates at its lower end in a bottom, ringlike flange 66a.

A flexible or bellowlike boot 68 of annular or cylindrical shape is shown secured at its upper end to the underside of the flange of the ring 67 by bolts 69 and, in a like manner, secured to upper ends of the cathode elements 62 by bolts 69. The boot 68 may be of rubber or resinlike material and is constructed to accord different vertical positions of the cathode elements 62 and to also protect the upper end of the anode 60 commensurate with the particular vertical extent of the operating surface of the anode 60 during the life of the battery. Like in the construction of batterys A and B, suitable insulating spacers or stand-off elements 63 are carried by the cathodes 62 to abut opposed operating surfaces of the anode 60 and maintain a proper spaced operating relation between the cathodes and the anodes throughout the life of the battery. Due to the somewhat frusto-conical or upwardly outwardly diverging shape of the battery C, the cathode elements 62 of each group, array or assembly, as controlled in operative-inward movement by a centrally disposed spring-pressed motor-like unit 75, are shown in FIG. 8A as of tapered thicknesses. If the cathodes 62 are of uniform thickness along their vertical lengths, then relatively short-length cathode elements may be used adjacent the upper end of the battery to fill in angle-shaped spaces between the main, full length cathode elements 62, with all of the elements of each group being securely connected together, as by weld metal, in an operating relation by a curved upper steel banding member 64, see particularly FIG. 8. Curved lower banding member 64', which may also be of steel straplike construction, is secured as by weld metal, adjacent lower end portions to the outer narrow or edge faces of full length cathode elements 62.

To provide a constant, vertically axially applied, inward-urging force to each group or assembly of the cathodes 62, a disc-shaped bottom support member or spindle 70 is provided with a group of, for example, four or quadrant-located, radially outwardly projecting, shelf portions 70a to carry spring-pressed motorlike units 75. One quadrant shelf is used for supporting and operatively positioning each of the four cathode groups or assemblies. It will be noted that the lower, annular flange 66a of the metal support and lining structure 66 serves as a mount for the bottom support member 70 through the agency of nut and bolt assemblies 71. Each unit 75 has a lower, inner, telescopic housing 72 and a main or outer housing 73 which together contain a spiral, tension spring 74 for operation therewithin. The relationship between the two housing parts 72 and 73 may be adjusted by releasing set screw 78 to thus adjust the length of the spacing between the housing parts. A piston rod assembly 76 operatively extends through the upper end of the housing of the unit 74 and has an eyelet at its upper end that is pivotally connected to an adjacent cathode member 62. The piston rod 76 at its lower end is in operative abutment with the upper end of the tension spring 74. As a result, the spring 74 always exerts an upward force on the inclined positions of the cathodes 62 of the arrays or assemblies to urge them inwardly with respect to the opposed operating surfaces of the anode 60.

In FIGS. 9 and 10, an improved form of cathode construction is illustrated in which a centrally disposed, substantially flat plate or core member 80 of a metal such as steel serves as a support body for a wrapped-around layer of iron screen wire material 81. As shown in FIG. 10, the inner end of the screen material may be secured or tacked by weld metal w to the support member 80, and the outermost end may be tack-welded by metal w to an adjacent or lower layer of the material. By way of illustration of the preferred construction, the member 80 will be of open gridlike or expanded metal construction to permit the electrolyte to flow fully through the electrode from the outside thereof between the staggered interstices provided by the mesh of the screening material 81.

In the embodiment of FIG. 11, wire mesh or screening material 86 is folded or doubled in layers on opposite wide sides of a metal support member 85 and may be secured as indicated by spot weld metal w at appropriate points. Support plate or gridlike members 80 or 85 provide relatively wide or open interstices as compared to the interstices defined by wirelike material or screening. By way of example, the open mesh of the wire screening 81 or 86 may, as an optimum, be provided by relatively fine wire screening of about No. 28 or 30 gauge. This represents a slightly finer wire than the screening used for doors or windows of a home. In the construction, random staggering is employed of the wires of the screen material of one layer with respect to adjacent layers. Each electrode may be made up of a total of about six layers of iron screening on each side of its central supporting metal member.

Where the battery is to be used in an area having a heavy sedimentation present, the member 80 or 85 may be provided as a solid planar or platelike member so as to avoid a tendency for the electrolyte to pass through the electrode. This inhibits water circulation through the base member 80 of the electrode to thereby reduce a tendency of the surrounding screen material to become clogged. Although surrounding springs are only illustrated with reference to the battery B, they may be used with the batteries of any of the embodiments to supplement or take the place of the inward urging means shown.

The battery B is particularly suitable where the diameter of the construction is limited or restricted for some reason, as for example, where the battery is to be introduced through a torpedo tube. This construction provides a long-lived battery which may have a relatively small diameter and an extended length or vertical extent. All the types of batteries shown for the purpose of illustration may also be dropped from a low flying plane, and by reason of their compensating characteristics from the standpoint of maintaining an efficient and effective operating spacing between the cathode and anode elements, will have a relatively long period of operating life, far surpassing the present minimum specification requirements of a 90-day life period under continuous utilization.

In the cathode construction illustrated in FIG. 8A, the cathode may be made in any suitable manner using the principles outlined in connection with the cathodes of uniform thickness. One way of providing radial cathodes with lengths of the varying thicknesses is to wind the wire mesh or screen material spirally about and along the flat core or base member. Of course, the ends of the screen mesh material will be tack-weld-secured in place.

I claim:

1. In a galvanic battery for generating electrical energy in a salt water electrolyte environment, a support frame structure, a metal anode and a cooperating group of metal cathodes carried by said frame structure, first means for positioning said cathodes in an operative spaced relation with respect to said anode, and second means cooperating with said first means for automatically adjusting the positioning of said cathodes with respect to said anode to retain the minimum operative spacing therebetween by urging said cathodes and said anode towards each other during the operating life of the battery.

2. In a battery as defined in claim 1, said cathodes having an endwise-positioned operative positioning with respect to an opposed operating surface of said anode, and said second means having means applying an inward force on said cathodes for moving said cathodes towards the opposed operating surface of the anode progressively as it erodes during the operation of the battery.

3. In a battery as defined in claim 1, said first means comprising insulating means interposed between said cathodes and said anode, and said second means is adapted to wedge said insulating means against an opposed operating surface of said anode.

4. In a battery as defined in claim 1, said cathodes being suspended by said support frame structure as an outwardly positioned group with respect to and along said anode, and said cathodes having wide side portions in a spaced relation with respect to each other and having narrow edge faces in a facing power-generating spaced relation with respect to said anode.

5. In a battery as defined in claim 4, each of said cathodes having a metal central support member, metal screening layered on said body member, and said screening having interstices open therethrough to said support member.

6. In a battery as defined in claim 5, said metal screening being secured in a wrapped around relation on said support member.

7. In a battery as defined in claim 5, said metal screening being secured in a folded relation on opposite sides of said support member.

8. In a battery as defined in claim 5, said support member being of grid-like construction to cooperate with said metal screening for flowing electrolyte therethrough.

9. In a battery as defined in claim 1, said first means comprising insulating spacer means mounted on said cathodes and interposed between said cathodes and said anode, and said second means comprising force-applying means that is resisted by said insulating spacer means.

10. In a battery as defined in claim 9, said second means being flexible means urging said cathodes towards said anode.

11. In a battery as defined in claim 9, said second means being a lever mechanism carried by said support structure and operatively connected to said cathodes.

12. In a battery as defined in claim 9, said second means being a lever system connected to said support frame and suspending said cathodes therefrom for urging said cathodes laterally towards said anode when a lifting force is applied to said lever system.

13. In a battery as defined in claim 9, said second means comprises spring means about said cathodes and urging them radially inwardly towards said anode.

14. In a battery as defined in claim 13, said support frame structure having upper and lower slotted end members, and said cathodes being operatively positioned for inward sliding movement along the slots of said upper and lower end members.

15. In a battery as defined in claim 9, said anode being of somewhat frusto-conical shape and being surrounded by said group of cathodes, said group of cathodes being positioned in a complementary sloped relation with respect to said anode, and said second means comprising: a rubberlike boot resiliently connecting upper end portions of said cathodes with said support structure and about said anode, and spring and plunger means connected between a lower portion of said support structure and said cathodes for urging said cathodes vertically upwardly towards said anode in an inclined plane represented by the slope of said anode.

16. In an improved galvanic battery for generating electrical energy and maintaining full power throughout its life as utilized in a salt water electrolyte environment, a support structure, a metal anode carried centrally by said support structure, a cooperating group of metal cathodes of elongated substantially planar shape suspended from said support structure in an endwise-opposed and spaced relation with respect to an operating surface of said anode, first means for limiting the minimum operative spacing of said cathodes with respect to said anode, and second means cooperating with said first means for automatically adjusting the positioning of said cathodes with respect to said anodes to substantially retain the minimum operative spacing therebetween during the operating life of the battery.

17. In an improved battery as defined in claim 16, insulation secured on surface portions of said anode that are remote from said cathodes for protecting said portions from erosion.

* * * * *